Sept. 28, 1926.
H. W. NAGEL
REVERSING GEAR
Filed June 3, 1921
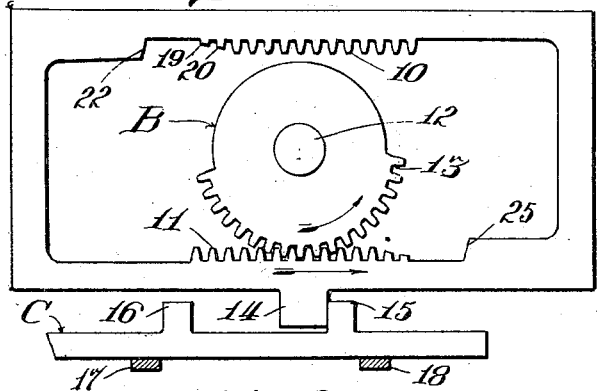
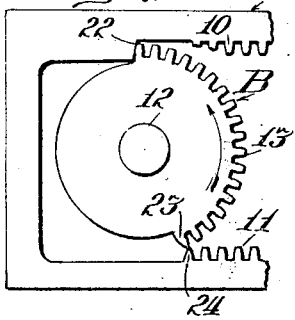
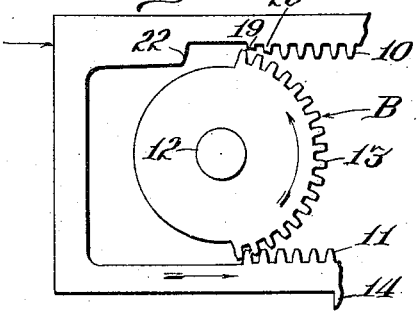
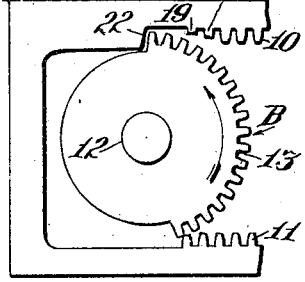
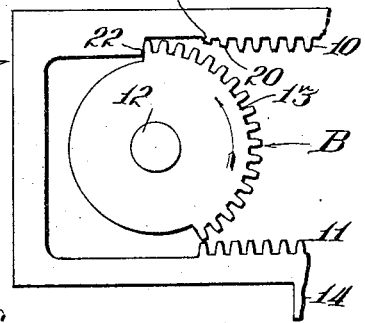
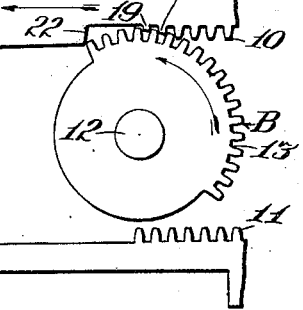
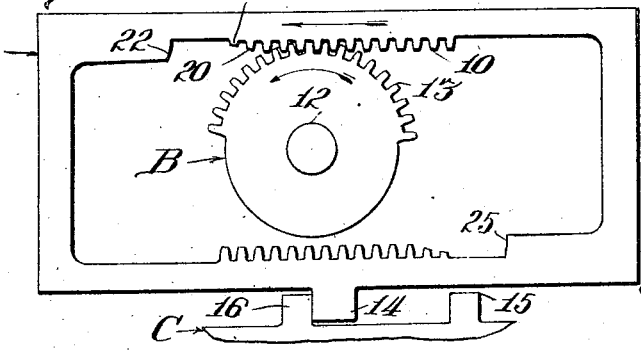

Patented Sept. 28, 1926.

1,601,188

UNITED STATES PATENT OFFICE.

HENRY W. NAGEL, OF CHICAGO, ILLINOIS, ASSIGNOR TO THOMAS H. FERGUSON, OF OAK PARK, ILLINOIS.

REVERSING GEAR.

Application filed June 3, 1921. Serial No. 474,667.

The present invention relates to reversing gears and more particularly to reversing gears employing intermeshing toothed members arranged to produce reciprocations of one member in response to rotations of another.

The principal object of the invention is to provide an organization of parts such that the reciprocating member will have a uniform rate of travel throughout the greater portion of its movement in either direction.

Other objects are to produce a mechanism which shall be simple in construction, economical to manufacture and reliable in operation.

For a full understanding of my invention reference should be had to the following detailed description taken in connection with the accompanying drawing while the scope of the invention will be particularly pointed out in the appended claims.

In said drawing, Fig. 1 is a diagrammatic view of a reversing gear constructed in accordance with my invention, the reciprocating member being near the center of its travel toward the right; Fig. 2 is a similar view showing the clearance between the shortened teeth of the upper rack and the foremost teeth of the rotary member, other teeth of the latter engaging the teeth of the lower rack near its left end; Fig. 3 is a similar view showing the last tooth of the rotary member just disengaging the last tooth at the left end of the lower rack; Fig. 4 is a similar view showing the first or foremost tooth of the rotary member just engaging the abutment associated with the upper rack; Fig. 5 is a similar view showing the first tooth disengaging said abutment and other teeth of the rotary member engaging the teeth of the upper rack causing the reciprocating member to move toward the left; Fig. 6 is a similar view showing the reciprocating member near the center of its travel towards the left; and Fig. 7 is a similar view of a modification. Throughout these views like characters refer to like parts.

Referring to the drawing in detail, A designates the reciprocating or driven member or element, B the rotary or driving member, and C a piece of mechanism actuated by the member B.

The member A is provided with an upper toothed rack 10 and a lower toothed rack 11. These racks are opposed to each other and the teeth of one rack extend toward the teeth of the other rack as clearly shown. The rotary member B is a gear segment mounted upon a shaft 12 to rotate in the space between the racks 10 and 11 and its teeth 13 cooperate with the teeth of the racks 10 and 11 in bringing about reciprocations of the member A.

When the parts are in the position of Fig. 1, the teeth 13 engage the teeth of the rack 11 and when in the position of Fig. 6 they engage the teeth of the rack 10. The former moves the member A to the right as shown by the arrow near the rack 11 in Fig. 1 and the latter moves the member to the left as shown by the arrow near the rack 10 in Fig. 6. Obviously the racks 10 and 11 may, or may not, be in the same plane. If in the same plane, the teeth 13 may have a relatively short dimension in the direction of the shaft 12. If the racks are in parallel planes, then the teeth 13 must have a length in the direction of the shaft 12 such as to intersect such planes and extend far enough beyond them to properly engage the teeth of the respective racks.

As the member A is reciprocated it may perform any desired reversing function. As shown in Fig. 1, this member is provided with a lug 14 which engages lug 15 in its movement to the right and lug 16 in its movement to the left to reciprocate member C upon guides 17 and 18. Because of the lost motion between lug 14 and lugs 15 and 16, the member C is given a different movement than member A. As an example of use, the member C may be used to operate clutches, one at each end, serving to throw one out and the other in upon its movement in either direction. Again, the member C may carry the bed of a printing press of the flat bed reciprocating type and reciprocate it in the operation of the press. Again, it may be used to good advantage in operating shaker screens. Other uses will occur to persons skilled in the mechanical arts and need not be recited herein. Indeed wherever a uniform rate of travel throughout practically the entire to and fro movements of a reciprocating member are desired, my invention can be used.

Returning now to a consideration of the mechanism and its operation, it will be seen that when the parts are in the position of Fig. 1, the continued rotation of the member B in the direction of the arrow will cause the teeth 13 to successively engage the teeth upon the rack 11 until the parts reach the position of Fig. 2. In this position we see that two of the teeth on the rack 10, designated respectively 19 and 20, are cut away so as to provide clearance for the forward teeth 13 upon the rotary member B. As the rotation of the driving member B continues, the teeth 13 gradually pass out of engagement with the teeth of the rack 11. When this point in the operation is reached and the last tooth 13 is just disengaging the last tooth of rack 11, we have the position of the parts depicted in Fig. 3. At this instant the foremost tooth 13 is approaching the abutment or shoulder 22 located to the left of the upper rack 10 but has not yet engaged it. Between the instant the last tooth 13 slips off the last tooth of rack 11 and the foremost tooth 13 engages the abutment 22, the driving member B is not applying a driving force to the driven member A. If momentum be neglected, then there is theoretically an interval of rest at this time. Of course as soon as the first tooth 13 engages abutment 22, the member A is started in the reverse direction, that is toward the left. At the instant of engagement of the first tooth 13 with abutment 22, the parts are in the position of Fig. 4. Thus, Fig. 3 shows the parts at the beginning of the rest interval and Fig. 4 shows them at the end of the interval. Or expressed somewhat differently, theoretically Fig. 3 illustrates the parts at the end of the rightward movement of member A and Fig. 4 illustrates the same at the begining of the leftward movement. Practically, the member A will have mass and momentum, and so when traveling to the right its motion in that direction will continue after the parts leave the postion of Fig. 3. In some instances the momentum may be negligible and the rest period will closely approach the theoretical rest period above measured. In other instances it may be such that the member A will continue its movement toward the right until arrested by the engagement of the first tooth 13 with abutment 22. And there may be other instances lying between these two. In any event the period of rest or retarded motion is very short and in most, if not all, of the possible applications of my invention to service, may be disregarded. It should be noted also that it comes at the end of the reciprocation of the member A and is a negligible part of the total movement.

It will also be seen that if the last tooth 13 and the last tooth on the rack 11 are pointed and if the abutment 22 be positioned so as to be engaged by the foremost tooth 13 just at the instant the pointed teeth separate, there will be no rest interval. This modification is illustrated in Fig. 7 wherein teeth 23 and 24 are pointed.

As the member A starts on its movement to the left as the result of the first tooth 13 engaging the abutment 22, said tooth applies pressure against said abutment until other teeth 13 are brought into driving engagement with the teeth of the upper rack 10. In the embodiment shown, at least the 5th and 6th teeth of the rotary member are in driving action before the first tooth passes out of engagement with abutment 22. The position of the parts at the time the first tooth is just clearing the abutment 22 is shown in Fig. 5. From this time on the teeth 13 engage the teeth of the rack 10 and continue the leftward movement of the member A until the last tooth 13 passes from engagement with the last tooth of the rack 10. Then the theoretical rest period begins at the other end of the reciprocation. This period continues until the first tooth 13 engages abutment 25 associated with the right end of the lower rack 11. These operations are the same as heretofore described but apply to passing the teeth 13 from the rack 10 to the rack 11 instead of from the rack 11 to the rack 10 as heretofore. Finally the position of Fig. 1 is again reached. Thus one complete cycle is completed and the same is repeated over and over as long as the parts are in operation.

From the above description it will be seen that I have provided a reversing gear in which two opposing racks are alternately engaged by a rotary driving segmental gear and novel means are provided for bringing the teeth of the rotary member out of engagement with one rack into engagement with the other and vice versa. An essential feature of my invention resides in this novel means for shifting from one rack to the other. By means of the regularly formed gear teeth upon the racks and gear segment, it will be seen that I obtain a uniform rate of travel for the reciprocating member throughout the greater portion of its travel. This uniformity is modified slightly by the mutilated teeth upon the racks 10 and 11 and by the associated abutments 22 and 25, but these slight modifications occur only at the ends of the reciprocations.

It will be apparent that in carrying out my invention many changes may be made in the arrangement and size of the parts and in the number of teeth upon the rotary and reciprocating members and other modifications may be made without departing from the spirit and scope of my invention. I therefore aim to cover by the terms of the appended claims all such changes and modifications.

What I claim as new and desire to secure by Letters Patent of the United States, is:

1. A reversing gear comprising a reciprocating member having opposed toothed racks, the teeth of the opposed racks extending toward each other and being of equal length except for a few shorter teeth at one end of each rack, a toothed gear segment rotatable in the space between said racks, the teeth of said segment having the same tip circle and being rigid upon the segment and operative to mesh with the teeth of said racks alternately to reciprocate said member, the extent of mesh measured in a direction at right angles to the plane of the segment being of the same length for all segment and rack teeth, and means coming into play towards the ends of the reciprocations of said member to bring the teeth of said segment into mesh with the teeth of said racks alternately.

2. A reversing gear comprising a reciprocating member having opposed toothed racks, the teeth of the opposed racks extending toward each other and being of equal length except for a few shorter teeth at one end of each rack, a toothed gear segment rotatable in the space between said racks, the teeth of said segment having the same tip circle and being rigid upon the segment and operative to mesh with the teeth of said racks alternately to reciprocate said member, the extent of mesh measured in a direction at right angles to the plane of the segment being of the same length for all segment and rack teeth, and means on said member co-operating with a tooth on said segment to bring the teeth of said segment into mesh with the teeth of said racks alternately.

3. A reversing gear comprising a reciprocating member having opposed toothed racks, the teeth of the opposed racks extending toward each other and being of equal length except for a few shorter teeth at one end of each rack, a toothed gear segment rotatable in the space between said racks, the teeth of said segment having the same tip circle and being rigid upon the segment and operative to mesh with the teeth of said racks alternately to reciprocate said member, the extent of mesh measured in a direction at right angles to the plane of the segment being of the same length for all segment and rack teeth, and abutments on said member, one at the end of each rack, co-operating with an end tooth of said segment to bring the teeth of said segment into mesh with the teeth of said racks alternately.

In testimony whereof, I hereunto subscribe my name this 1st day of June, A. D. 1921.

HENRY W. NAGEL.